Patented Sept. 6, 1949

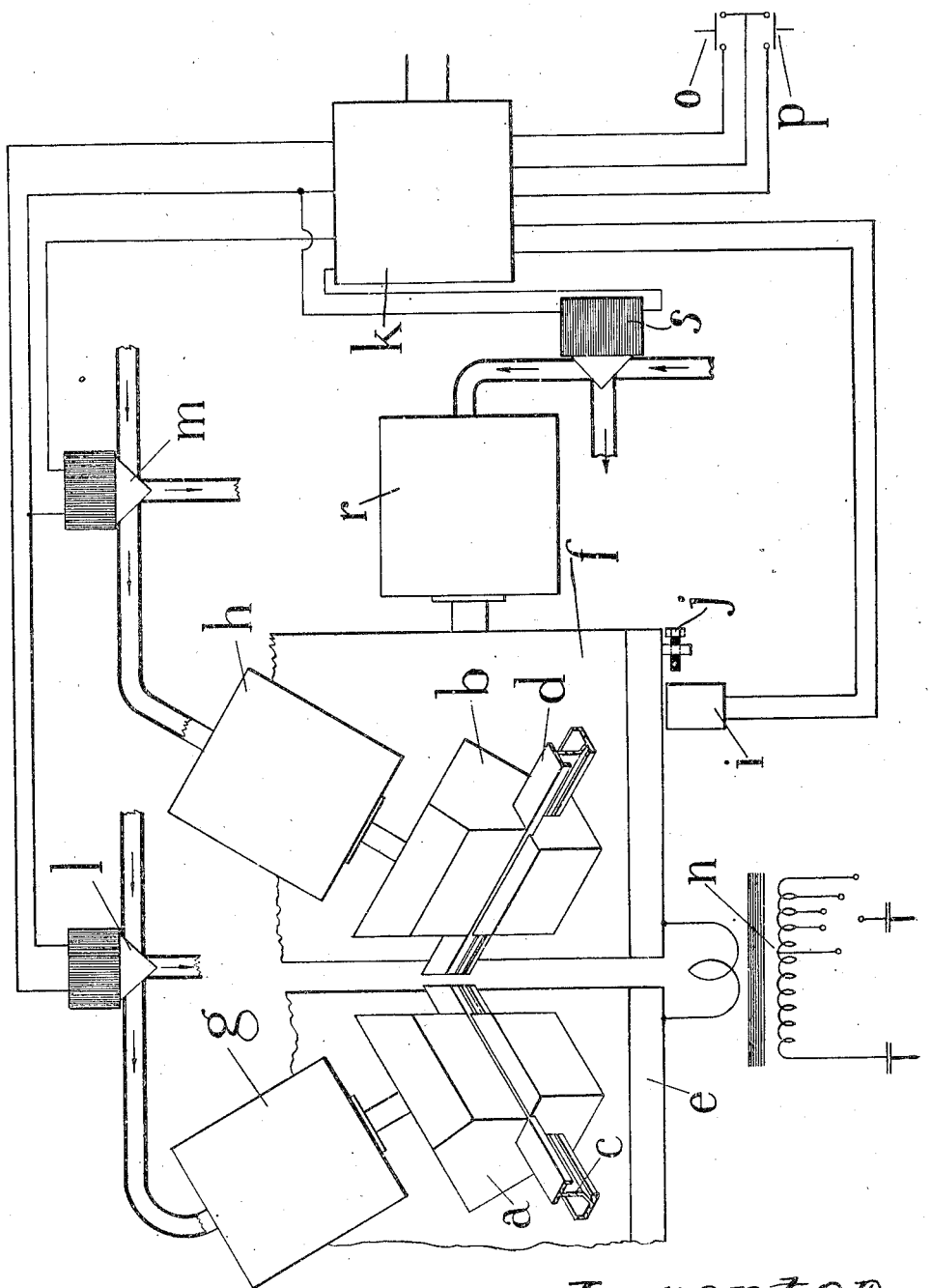

2,481,317

UNITED STATES PATENT OFFICE 2,481,317

ELECTRIC WELDING APPARATUS

Basil Heathcote Lepine-Williams, Coventry, England

Application August 21, 1947, Serial No. 769,926
In Great Britain September 16, 1946

2 Claims. (Cl. 219—4)

This invention relates to electric welding apparatus and has for its object to provide an improved form of apparatus particularly suitable for the welding of aluminium and other light alloys although it will be understood that the invention is not restricted in this respect.

The invention consists in electric welding apparatus comprising a fixed head to support a first electrode, a movable table to support a second electrode, means for moving the said movable table to and from the said fixed head to make contact between the said first and second electrodes and to complete the welding cycle, movable clamping means upon the fixed head to secure the said first electrode thereupon, movable clamping means upon the movable table to secure the said second electrode thereupon, a delay device including control means associated with the means for moving the said movable table and the means for moving the movable clamping means, adjustable means fixed upon the fixed head and movable table operated by movement of one member towards the other to initiate the delayed cycle of operation including the releasing of the clamps and movement of the table away from the fixed head and manually operable means for controlling the closing of the clamps and movement of the table towards the fixed head.

Further features of the invention will be apparent from the description given hereafter.

The accompanying drawing illustrates more or less diagrammatically one convenient form of apparatus in accordance with the invention.

In carrying my invention into effect in one convenient manner I form my improved welding apparatus with two clamps for holding the electrodes $a$ and $b$, one being arranged on a fixed head $e$, while the other is mounted on a movable table $f$. The operation of the clamps and of the table is conveniently effected by air or other fluid under pressure and in association with the apparatus I provide a limit switch $i$ adapted to be actuated automatically by the movable head and table through adjusting screw $j$ in order that the position of the table at which the limit switch operates can be varied. When the table is moved to bring the clamps together limit switch $i$ operates to close an electronic or other suitable timing circuit $k$, which after a predetermined period of delay (which may be varied to suit the nature of the welding operation to be performed) trips contactors energising electromagnetically operated valves $l$, $m$ controlling the supply of fluid to and from the cylinders $g$, $h$ to open the clamps and initiates a timing circuit which energises an electromagnetically operated valve $s$ controlling the supply of pressure fluid to the return cylinder on the table or movable head to return same to the normal position for the next weld.

The supply of welding current may be provided by a transformer $n$ across the secondary of which the parts $e$, $f$ are connected, and clamp controlling push buttons $o$, $p$ may be provided to start up the apparatus.

In operation of the machine the working pieces $c$ and $d$ are placed in the clamps which are closed by depressing push buttons $o$ and $p$, this completes the circuit energising the coils of the contactors, thus actuating the valves $l$ and $m$ which cause a flow of fluid to act upon the top surface of the pistons $g$ and $h$, thus clamping the working pieces $c$ and $d$. When the table $f$ is moved forward in order to make the weld the adjustable screw $j$ closes the limit switch $i$ a predetermined position which is adjustable to suit the nature of the work being performed.

By way of illustration the flow of fluid in the pipes is shown at the commencement of the welding cycle.

It will be understood that the foregoing details of construction are given purely by way of example to indicate the nature of the invention and not to limit its scope and in place of the fluid pressure operated means for actuating the clamps and table I may employ electrical or mechanical means for the purpose, in which case the controls governed by the automatically operated limit switch would be chosen to suit the character of operating means employed.

I claim:

1. Electric welding apparatus comprising a fixed head to support a first electrode, a movable table to support a second electrode, means for moving the said movable table to and from the said fixed head to make contact between the said first and second electrodes and to complete the welding cycle, movable clamping means upon the fixed head to secure the said first electrode thereupon, movable clamping means upon the movable table to secure the said second electrode thereupon, a delay device including control means associated with the means for moving the said movable table and the means for moving the movable clamping means, adjustable means fixed upon the fixed head and movable table operated by movement of one member towards the other to initiate the delayed cycle of operation including the releasing of the clamps and movement of the table away from the fixed head and manually operable means for controlling the closing of the clamps and movement of the table towards the fixed head.

2. Electric welding apparatus comprising a fixed head to support a first electrode, a movable table to support a second electrode, fluid operated means for moving the said movable table to and from the said fixed head to make contact between the said first and said second electrodes and to complete the welding cycle, fluid operated clamping means upon the fixed head to secure the said first electrode thereupon, fluid operated clamping means upon the movable table to secure the said second electrode thereupon, electromagnetically operated valves associated with the means for moving the table and the clamping means, an electrical delay device for controlling the operation of said valves, adjustable means upon the movable table associated with means upon the fixed head to close an electric circuit by movement of the table towards the fixed head to initiate a delayed cycle of operation including the release of the clamps and movement of the table away from the fixed head, the extent of the delay being adjustable to a predetermined period, and manually operable means for closing electric circuits for the closing of the clamps and movement of the table towards the fixed head.

BASIL H. LEPINE-WILLIAMS.

REFERENCES CITED

The following references are of record in the file of this patent:

UNITED STATES PATENTS

| Number | Name | Date |
|---|---|---|
| 1,847,890 | Osborne | Mar. 1, 1932 |
| 1,892,208 | Ferris et al. | Dec. 27, 1932 |
| 1,902,955 | Holmes | Mar. 28, 1933 |
| 2,211,186 | Weston | Aug. 13, 1940 |
| 2,359,324 | Marcaux | Oct. 3, 1944 |